(12) United States Patent
Rufus et al.

(10) Patent No.: US 11,396,617 B2
(45) Date of Patent: Jul. 26, 2022

(54) ADHESIVE FORMULATIONS THAT ARE FREE OF ASPHALT OR SUBSTANTIALLY FREE OF ASPHALT, METHODS OF MAKING THE SAME, AND ROOFING SYSTEMS UTILIZING THE SAME

(71) Applicant: BMIC LLC, Dallas, TX (US)

(72) Inventors: Isaac Bernard Rufus, Newark, DE (US); Adem Chich, Kearny, NJ (US); Overton Williams, Paterson, NJ (US); Richard Chin, Livingston, NJ (US); Michael Dougherty, Mount Arlington, NJ (US); Ramil Marcelo L. Mercado, Waxahachie, TX (US); Jarod L. Krajca, Ennis, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/466,511

(22) Filed: Sep. 3, 2021

(65) Prior Publication Data

US 2022/0064501 A1    Mar. 3, 2022

Related U.S. Application Data

(60) Provisional application No. 63/168,879, filed on Mar. 31, 2021, provisional application No. 63/104,150, filed on Oct. 22, 2020, provisional application No. 63/074,358, filed on Sep. 3, 2020.

(51) Int. Cl.
*C09J 109/06* (2006.01)
*C09J 11/04* (2006.01)
*C09J 123/12* (2006.01)
*E04D 1/34* (2006.01)
*C09J 11/06* (2006.01)

(52) U.S. Cl.
CPC ............. *C09J 109/06* (2013.01); *C09J 11/04* (2013.01); *C09J 11/06* (2013.01); *C09J 123/12* (2013.01); *E04D 1/34* (2013.01); *E04D 2001/3435* (2013.01)

(58) Field of Classification Search
CPC . C09J 109/06; C09J 11/04; C09J 11/06; C09J 123/12; E04D 1/34; E04D 2001/3435
USPC ......................................................... 524/240
See application file for complete search history.

(56) References Cited

U.S. PATENT DOCUMENTS

| | | | |
|---|---|---|---|
| 5,380,552 A | 1/1995 | George et al. | |
| 2017/0008233 A1* | 1/2017 | Vontorcik, Jr | C08G 18/4277 |
| 2020/0095478 A1* | 3/2020 | Young | E04D 5/148 |

* cited by examiner

*Primary Examiner* — Ling Siu Choi
*Assistant Examiner* — Ronald Grinsted
(74) *Attorney, Agent, or Firm* — Greenberg Traurig, LLP

(57) ABSTRACT

Some embodiments of the present disclosure relate to roofing systems including a substrate and adhesive formulations that are free of asphalt or substantially free of asphalt. Some embodiments of the present disclosure relate to methods of making one or more adhesive formulations that are free of asphalt or substantially free of asphalt. Some embodiments of the present disclosure relate to systems utilizing one or more adhesive formulations that are free of asphalt or substantially free of asphalt.

20 Claims, 1 Drawing Sheet

ADHESIVE FORMULATIONS THAT ARE FREE OF ASPHALT OR SUBSTANTIALLY FREE OF ASPHALT, METHODS OF MAKING THE SAME, AND ROOFING SYSTEMS UTILIZING THE SAME

CROSS-REFERENCE TO RELATED APPLICATIONS

This application claims priority to: U.S. Provisional Patent Application No. 63/074,358, filed Sep. 3, 2020, and titled "ADHESIVE FORMULATIONS THAT ARE FREE OF ASPHALT OR SUBSTANTIALLY FREE OF ASPHALT, METHODS OF MAKING THE SAME, AND ROOFING SYSTEMS UTILIZING THE SAME;" U.S. Provisional Patent Application No. 63/104,150, filed Oct. 22, 2020, and titled "ADHESIVE FORMULATIONS THAT ARE FREE OF ASPHALT OR SUBSTANTIALLY FREE OF ASPHALT, METHODS OF MAKING THE SAME, AND ROOFING SYSTEMS UTILIZING THE SAME;" and priority to U.S. Provisional Patent Application No. 63/168,879, filed Mar. 31, 2021, and titled "ADHESIVE FORMULATIONS THAT ARE FREE OF ASPHALT OR SUBSTANTIALLY FREE OF ASPHALT, METHODS OF MAKING THE SAME, AND ROOFING SYSTEMS UTILIZING THE SAME;" the disclosures of which applications are hereby incorporated herein by reference in their entireties.

FIELD

The field of the present disclosure relates to adhesive formulations that are free of asphalt or substantially free of asphalt. In one non-limiting example, the adhesive formulations described herein may be utilized in the roofing arts.

BACKGROUND

Asphaltic adhesives are used in various areas, such as but not limited to, as sealants for roofing shingles. However, asphaltic adhesives may require elevated temperatures for activation, making their use impractical in certain circumstances.

SUMMARY

Some embodiments of the present disclosure relate to an adhesive formulation that is free or substantially free of asphalt. In some embodiments, the adhesive formulation comprises at least one process oil and at least one polymer. In some embodiments, the adhesive formulation comprises limestone powder, at least one process oil, and at least one polymer. In some embodiments, the adhesive formulation comprises at least one tackifier, at least one process oil, and at least one polymer.

Some embodiments of the present disclosure relate to a method of making an adhesive formulation that is free or substantially free of asphalt. In some embodiments, the method comprises combining at least one process oil and at least one polymer. In some embodiments, the method comprises combining limestone powder with at least one process oil and at least one polymer. In some embodiments, the method comprises combining at least one tackifier with at least one process oil and at least one polymer.

Some embodiments of the present disclosure relate to a method of using an adhesive formulation that is free or substantially free of asphalt.

Some embodiments of the present disclosure relate to a system comprising a substrate and an adhesive formulation, where the adhesive formulation is free or substantially free of asphalt, and where the adhesive formulation is present on at least one surface of the substrate.

In some embodiments, a method includes combining limestone powder with at least one process oil and at least one polymer, so as to form an adhesive formulation. In some embodiments, the adhesive formulation includes 10 wt % to 60 wt % of the limestone powder based on a total weight of the adhesive formulation; 20 wt % to 70 wt % of the at least one process oil based on the total weight of the adhesive formulation; and 0.5 wt % to 30 wt % of the at least one polymer based on a total weight of the adhesive formulation. In some embodiments, the adhesive formulation is free of asphalt or substantially free of asphalt.

In some embodiments, the at least one process oil is chosen from at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), at least one tall oil, or any combination thereof.

In some embodiments, the at least one polymer is a styrene-butadiene-styrene (SBS) copolymer.

In some embodiments, the at least one polymer is present in an amount of 0.5 wt % to 30 wt % based on the total weight of the adhesive formulation.

In some embodiments, the adhesive formulation includes at least one second polymer chosen from: at least one polyolefin, oxidized polyethylene (OPE), polyethylene-polypropylene elastomer, ground tire rubber (GTR), isotactic polypropylene (IPP), atactic polypropylene (APP), or any combination thereof.

In some embodiments, the at least one second polymer is present in an amount of 0.1 wt % to 20 wt % based on the total weight of the adhesive formulation.

In some embodiments, the adhesive formulation includes at least one filler in an amount ranging from 0.00001% to 70% by weight of the adhesive formulation.

In some embodiments, the at least one filler is calcium carbonate, barium sulfate, calcium sulfate, talc, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, or any combination thereof.

In some embodiments, the adhesive formulation includes at least one additive in an amount ranging from 0.00001% to 70% by weight of the adhesive formulation.

In some embodiments, the at least one additive is at least one wax, at least one antioxidant, ethylene-bis-stearamide (EBS), or any combination thereof.

In some embodiments, the adhesive formulation achieves at least a passing grade when tested according to ASTM D1970 at a specific test temperature.

In some embodiments, the passing grade is 2 lb/ft at the specific test temperature of 40° F.

In some embodiments, the passing grade is 12 lb/ft at the specific test temperature of 75° F.

In some embodiments, the method includes applying the adhesive formulation to at least one surface of a substrate.

In some embodiments, the substrate is a plywood substrate, a glass substrate, a cellulosic substrate, a roofing shingle, an underlayment, a roofing membrane, a roof deck, a photovoltaic (PV) panel, a modified bitumen (MODBIT) substrate, a roll good, a polyisocyanurate (ISO) foam board, a chimney or any combination thereof.

In some embodiments, the method includes forming the adhesive formulation into at least one adhesive sheet, forming the adhesive formulation into at least one adhesive strip, or any combination thereof.

In some embodiments, the forming of the adhesive formulation into at least one adhesive sheet, the forming the adhesive formulation into at least one adhesive strip, or any combination thereof includes casting the adhesive formulation into the at least one adhesive sheet, casting the adhesive formulation into the at least one adhesive strip, or any combination thereof.

In some embodiments, the method includes forming the adhesive formulation into a flowable adhesive formulation, wherein the flowable adhesive formulation has a viscosity of 1,000 cP to 10,000 cP measured at 374° F., using a Brookfield viscometer with spindle number LV-4, and a viscometer speed of 60 RPM.

In some embodiments, the method includes forming the adhesive formulation into a flowable adhesive formulation, wherein the flowable adhesive formulation has a viscosity of 10,000 cP to 30,000 cP measured at 374° F., using a Brookfield viscometer with spindle number LV-4, and a viscometer speed of 30 RPM.

In some embodiments, the method includes forming the adhesive formulation into a flowable adhesive formulation, wherein the forming of the flowable adhesive formulation includes heating the adhesive formulation to a temperature of 300° F. to 400° F.

In some embodiments, the method includes using the adhesive formulation to seal a leak.

In some embodiments, the leak is present on a surface of a substrate, between multiple surfaces of a substrate, between multiple substrates, or any combination thereof.

In some embodiments, the substrate, the multiple substrates, or any combination thereof is a roofing substrate.

In some embodiments, the roofing substrate is a roofing shingle.

In some embodiments, an adhesive formulation includes 10 wt % to 60 wt % of limestone powder based on a total weight of the adhesive formulation. In some embodiments, the adhesive formulation includes 20 wt % to 70 wt % of at least one process oil based on the total weight of the adhesive formulation. In some embodiments, the adhesive formulation includes 0.5 wt % to 30 wt % of at least one polymer based on the total weight of the adhesive formulation. In some embodiments, the adhesive formulation is free of asphalt or substantially free of asphalt.

In some embodiments, an adhesive formulation consists essentially of 10 wt % to 60 wt % of limestone powder based on a total weight of the adhesive formulation; 20 wt % to 70 wt % of at least one process oil based on the total weight of the adhesive formulation; and 0.5 wt % to 30 wt % of at least one polymer based on the total weight of the adhesive formulation. In some embodiments, the adhesive formulation achieves at least a passing grade of 2 lb/ft when tested according to ASTM D1970 at a specific test temperature of 40° F.

In some embodiments, an adhesive formulation consists essentially of 10 wt % to 60 wt % of limestone powder based on a total weight of the adhesive formulation; 20 wt % to 70 wt % of at least one process oil based on a total weight of the adhesive formulation; and 0.5 wt % to 30 wt % of at least one polymer based on a total weight of the adhesive formulation. In some embodiments, the adhesive formulation achieves at least a passing grade of 12 lb/ft when tested according to ASTM D1970 at a specific test temperature of 75° F.

In some embodiments, a system includes a substrate; and an adhesive formulation. In some embodiments, the adhesive formulation is present on at least one surface of the substrate. In some embodiments, the adhesive formulation includes 10 wt % to 60 wt % of limestone powder based on a total weight of the adhesive formulation; 20 wt % to 70 wt % of at least one process oil based on the total weight of the adhesive formulation; and 0.5 wt % to 30 wt % of at least one polymer based on the total weight of the adhesive formulation. In some embodiments, the adhesive formulation is free of asphalt or substantially free of asphalt.

In some embodiments, the substrate is a first substrate, the system includes a second substrate, and the adhesive formulation is present between the first substrate and the second substrate.

In some embodiments, the first substrate and the second substrate are the same.

In some embodiments, the first substrate and the second substrate are different.

In some embodiments, the first substrate, the second substrate, or any combination thereof is a roofing shingle.

In some embodiments, a method includes combining at least one tackifier with at least one process oil and at least one polymer, so as to form an adhesive formulation. In some embodiments, the adhesive formulation includes 10 wt % to 60 wt % of the at least one tackifier based on a total weight of the adhesive formulation; 20 wt % to 70 wt % of the at least one process oil based on the total weight of the adhesive formulation; and 0.5 wt % to 30 wt % of the at least one polymer based on the total weight of the adhesive formulation. In some embodiments, the adhesive formulation is free of asphalt or substantially free of asphalt.

In some embodiments, the at least one process oil is chosen from at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), or any combination thereof.

In some embodiments, the at least one process oil is at least one tall oil.

In some embodiments, the at least one tall oil takes the form of tall oil pitch.

In some embodiments, the at least one tackifier is at least one rosin ester.

In some embodiments, the at least one rosin ester is at least one pentaerythritol rosin ester.

In some embodiments, the at least one rosin ester is at least one glycerol rosin ester.

In some embodiments, the at least one tackifier is chosen from: at least one terpene resin, at least one petroleum resin, at least one hydrogenated rosin, at least one rosin milk, at least one petroleum resin emulsion, at least one terpene-phenolic resin, at least one hydrogenated petroleum resin, at least one liphatic hydrocarbon resin, at least one hydrogenated aliphatic hydrocarbon resin, at least one aromatic modified aliphatic hydrocarbon resin, at least one hydrogenated aromatic modified aliphatic hydrocarbon resin, at least one polycyclopentadiene resin, at least one hydrogenated polycyclopentadiene resin, at least one cycloaliphatic hydrocarbon resin, at least one hydrogenated cycloaliphatic resin, cycloaliphatic/aromatic hydrocarbon resin, at least one hydrogenated cycloaliphatic/aromatic hydrocarbon resin, hydrogenated aromatic hydrocarbon resin, at least one maleic acid/anhydride modified tackifier, terpene modified aromatic and/or aliphatic hydrocarbon resin, at least one hydrogenated terpene modified aromatic and/or aliphatic hydrocarbon resin, at least one polyterpene resin, at least one hydrogenated polyterpene resin, at least one aromatic modified polyterpene resin, at least one hydrogenated aromatic modified polyterpene resin, at least one terpene-phenol resin, at least one hydrogenated terpene-phenol resin, at least one gum rosin resin, at least one hydrogenated gum rosin resin, at least one gum rosin ester resin, at least one wood rosin resin, at least one hydrogenated wood rosin resin, at least one rosin acid resin, at least one hydrogenated rosin acid resin, or any combination thereof.

In some embodiments, the at least one polymer is a styrene-butadiene-styrene (SBS) copolymer.

In some embodiments, the at least one polymer is present in an amount of 0.5 wt % to 30 wt % based on a total weight of the adhesive formulation.

In some embodiments, the adhesive formulation includes at least one second polymer, wherein the second polymer is a styrene-ethylene-butylene-styrene (SEBS) copolymer.

In some embodiments, the at least one second polymer is present in an amount of 0.1 wt % to 20 wt % based on a total weight of the adhesive formulation.

In some embodiments, an adhesive formulation includes 10 wt % to 60 wt % of at least one tackifier based on a total weight of the adhesive formulation; 20 wt % to 70 wt % of at least one process oil based on the total weight of the adhesive formulation; and 0.5 wt % to 30 wt % of at least one polymer based on the total weight of the adhesive formulation. In some embodiments, the adhesive formulation is free of asphalt or substantially free of asphalt.

In some embodiments, an adhesive formulation consists essentially of 10 wt % to 60 wt % of at least one tackifier based on a total weight of the adhesive formulation; 20 wt % to 70 wt % of at least one process oil based on the total weight of the adhesive formulation; and 0.5 wt % to 30 wt % of at least one polymer based on the total weight of the adhesive formulation. In some embodiments, the adhesive formulation achieves a mechanical uplift of at least 20 lb/ft when tested according to ASTM D6381 after being conditioned at 140° F. for 16 hours.

In some embodiments, the adhesive formulation achieves a mechanical uplift of 20 lb/ft to 100 lb/ft when tested according to ASTM D6381 after being conditioned at 140° F. for 16 hours.

In some embodiments, the adhesive formulation has an activation temperature of 15° F. to 60° F.

In some embodiments, the adhesive formulation has a Dahlquist Criterion Temperature of 35° F. to 65° F.

In some embodiments, the adhesive formulation has a peel strength of 7.5 MPa to 50 MPa measured at 25° C.

In some embodiments, a system includes a substrate; and an adhesive formulation. In some embodiments, the adhesive formulation is present on at least one surface of the substrate. In some embodiments, the adhesive formulation includes 10 wt % to 60 wt % of at least one tackifier based on a total weight of the adhesive formulation; 20 wt % to 70 wt % of at least one process oil based on the total weight of the adhesive formulation; and 0.5 wt % to 30 wt % of at least one polymer based on the total weight of the adhesive formulation. In some embodiments, the adhesive formulation is free of asphalt or substantially free of asphalt.

In some embodiments, the substrate is a first substrate, wherein the system includes a second substrate, and wherein the adhesive formulation is present between the first substrate and the second substrate.

In some embodiments, the first substrate and the second substrate are the same.

In some embodiments, the first substrate and the second substrate are different.

In some embodiments, the first substrate is a TPO substrate.

In some embodiments, the second substrate is an ETFE substrate.

In some embodiments, an adhesive formulation includes 10 wt % to 60 wt % of limestone powder, at least one tackifier, or any combination thereof based on a total weight of the adhesive formulation; 20 wt % to 70 wt % of at least one process oil based on a total weight of the adhesive formulation; and 0.5 wt % to 30 wt % of at least one polymer based on a total weight of the adhesive formulation. In some embodiments, the adhesive formulation is free of asphalt or substantially free of asphalt.

In some embodiments, an adhesive formulation includes 10 wt % to 60 wt % of limestone powder, at least one tackifier, or any combination thereof based on a total weight of the adhesive formulation; 20 wt % to 70 wt % of at least one process oil based on the total weight of the adhesive formulation; and 0.5 wt % to 30 wt % of at least one first polymer based on the total weight of the adhesive formulation; and 0.1 wt % to 20 wt % of at least one second polymer based on the total weight of the adhesive formulation. In some embodiments, the adhesive formulation is free of asphalt or substantially free of asphalt.

In some embodiments, an adhesive formulation includes 20 wt % to 70 wt % of at least one process oil based on a total weight of the adhesive formulation; and 0.5 wt % to 30 wt % of at least one polymer based on the total weight of the adhesive formulation. In some embodiments, the adhesive formulation is free of asphalt or substantially free of asphalt.

In some embodiments, an adhesive formulation includes 20 wt % to 70 wt % of at least one process oil based on a total weight of the adhesive formulation; and 0.5 wt % to 30 wt % of at least one styrene-butadiene-styrene (SBS) copolymer based on the total weight of the adhesive formulation. In some embodiments, the adhesive formulation is free of asphalt or substantially free of asphalt.

In some embodiments, an adhesive formulation includes 20 wt % to 70 wt % of tall oil based on a total weight of the adhesive formulation; 0.5 wt % to 30 wt % of at least one styrene-butadiene-styrene (SBS) copolymer based on the total weight of the adhesive formulation; and 0.1 wt % to 20 wt % of at least one styrene-ethylene-butylene-styrene (SEBS) copolymer based on the total weight of the adhesive formulation. In some embodiments, the adhesive formulation is free of asphalt or substantially free of asphalt.

In some embodiments, an adhesive formulation consists essentially of 10 wt % to 60 wt % of limestone powder, at least one tackifier, or any combination thereof based on a total weight of the adhesive formulation; 20 wt % to 70 wt % of at least one process oil based on the total weight of the adhesive formulation; 0.5 wt % to 30 wt % of at least one polymer based on the total weight of the adhesive formulation; and optionally, 0.1 wt % to 30 wt % of at least one second polymer based on the total weight of the adhesive formulation.

In some embodiments, an adhesive formulation consists essentially of 20 wt % to 70 wt % of at least one process oil based on a total weight of the adhesive formulation; 0.5 wt % to 30 wt % of at least one styrene-butadiene-styrene (SBS) copolymer based on the total weight of the adhesive formulation; 10 wt % to 60 wt % of: limestone powder, at least one tackifier, or optionally, any combination thereof, based on the total weight of the adhesive formulation; and optionally, 0.1 wt % to 20 wt % of at least one styrene-ethylene-butylene-styrene (SEBS) copolymer based on the total weight of the adhesive formulation.

In some embodiments, an adhesive formulation consists essentially of 20 wt % to 70 wt % of at least one first process oil based on a total weight of the adhesive formulation, wherein the at least one first process oil is tall oil; 0.5 wt % to 30 wt % of at least one styrene-butadiene-styrene (SBS) copolymer based on the total weight of the adhesive formulation; 10 wt % to 60 wt % of at least one tackifier based on the total weight of the adhesive formulation; optionally, 10 wt % to 60 wt % of limestone powder based on the total weight of the adhesive formulation; optionally, 0.1 wt % to 20 wt % of at least one styrene-ethylene-butylene-styrene (SEBS) copolymer based on the total weight of the adhesive formulation; and optionally, 20 wt % to 70 wt % of at least one second process oil based on the total weight of the adhesive formulation.

In some embodiments, an adhesive formulation consists essentially of 20 wt % to 70 wt % of at least one first process oil based on a total weight of the adhesive formulation; 0.5 wt % to 30 wt % of at least one first polymer based on the total weight of the adhesive formulation; 10 wt % to 60 wt % of at least one tackifier based on the total weight of the adhesive formulation; optionally, 10 wt % to 60 wt % of limestone powder based on the total weight of the adhesive formulation; optionally, 0.1 wt % to 20 wt % of at least one second polymer based on the total weight of the adhesive formulation; and optionally, 20 wt % to 70 wt % of at least one second process oil based on the total weight of the adhesive formulation.

In some embodiments, a method includes combining limestone powder with at least one process oil and at least one polymer, so as to form an adhesive formulation. In some embodiments, the adhesive formulation includes 10 wt % to 60 wt % of the limestone powder, at least one tackifier or any combination thereof, based on a total weight of the adhesive formulation; 0.1 wt % to 50 wt % of at least one fire retardant based on the total weight of the adhesive formulation; 20 wt % to 70 wt % of the at least one process oil based on the total weight of the adhesive formulation; and 0.5 wt % to 30 wt % of the at least one polymer based on the total weight of the adhesive formulation. In some embodiments, the adhesive formulation is free of asphalt or substantially free of asphalt.

In some embodiments, an adhesive formulation includes 10 wt % to 60 wt % of limestone powder, at least one tackifier, or any combination thereof based on a total weight of the adhesive formulation; 20 wt % to 70 wt % of at least one process oil based on the total weight of the adhesive formulation; 0.1 wt % to 50 wt % of at least one fire retardant based on the total weight of the adhesive formulation; and 0.5 wt % to 30 wt % of at least one polymer based on the total weight of the adhesive formulation. In some embodiments, the adhesive formulation is free of asphalt or substantially free of asphalt.

In some embodiments, a system includes a substrate; and an adhesive formulation, wherein the adhesive formulation is present on at least one surface of the substrate. In some embodiments, the adhesive formulation includes 10 wt % to 60 wt % of limestone powder, at least one tackifier, or any combination thereof based on a total weight of the adhesive formulation; 20 wt % to 70 wt % of at least one process oil based on the total weight of the adhesive formulation; 0.1 wt % to 50 wt % of at least one fire retardant based on the total weight of the adhesive formulation; and 0.5 wt % to 30 wt % of at least one polymer based on the total weight of the adhesive formulation. In some embodiments, the adhesive formulation is free of asphalt or substantially free of asphalt.

In some embodiments, a method, includes combining a filler with at least one process oil and at least one polymer, so as to form an adhesive formulation. In some embodiments, the adhesive formulation includes 10 wt % to 70 wt % of the filler based on a total weight of the adhesive formulation. In some embodiments, the adhesive formulation includes 20 wt % to 70 wt % of the at least one process oil based on a total weight of the adhesive formulation. In some embodiments, the adhesive formulation includes 0.5 wt % to 30 wt % of the at least one polymer based on a total weight of the adhesive formulation. In some embodiments, the adhesive formulation is free of asphalt or substantially free of asphalt.

In some embodiments, the at least one process oil is chosen from at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), at least one tall oil, or any combination thereof.

In some embodiments, the at least one polymer is a styrene-butadiene-styrene (SBS) copolymer.

In some embodiments, the at least one polymer is present in an amount of 0.5 wt % to 30 wt % based on a total weight of the adhesive formulation.

In some embodiments, the adhesive formulation includes at least one second polymer chosen from: at least one polyolefin, oxidized polyethylene (OPE), polyethylene-polypropylene elastomer, ground tire rubber (GTR), isotactic polypropylene (IPP), atactic polypropylene (APP), or any combination thereof.

In some embodiments, the at least one second polymer is present in an amount of 0.1 wt % to 20 wt % based on a total weight of the adhesive formulation.

In some embodiments, the at least one filler is limestone powder, calcium carbonate, barium sulfate, calcium sulfate, talc, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, or any combination thereof.

In some embodiments, the at least one filler is limestone powder.

In some embodiments, the adhesive formulation includes at least one additive in an amount ranging from 0.00001% to 70% by weight of the adhesive formulation.

In some embodiments, the at least one additive is at least one wax, at least one antioxidant, ethylene-bis-stearamide (EBS), or any combination thereof.

In some embodiments, the adhesive formulation includes 0.1 wt % to 50 wt. % of at least one fire retardant based on a total weight of the adhesive formulation.

In some embodiments, a method includes combining a filler with at least one process oil and at least one polymer, so as to form an adhesive formulation. In some embodiments, the adhesive formulation includes 10 wt % to 70 wt % of the filler, at least one tackifier or any combination thereof, based on a total weight of the adhesive formulation. In some embodiments, the adhesive formulation includes 0.1 wt % to 50 wt % of at least one fire retardant based on a total weight of the adhesive formulation. In some embodiments, the adhesive formulation includes 20 wt % to 70 wt % of the at least one process oil based on a total weight of the adhesive formulation. In some embodiments, the adhesive formulation includes 0.5 wt % to 30 wt % of the at least one polymer based on a total weight of the adhesive formulation. In some embodiments, the adhesive formulation is free of asphalt or substantially free of asphalt.

In some embodiments, the at least one process oil is chosen from at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), at least one tall oil, or any combination thereof.

In some embodiments, the at least one polymer is a styrene-butadiene-styrene (SBS) copolymer.

In some embodiments, the at least one polymer is present in an amount of 0.5 wt % to 30 wt % based on a total weight of the adhesive formulation.

In some embodiments, the adhesive formulation includes at least one second polymer chosen from: at least one polyolefin, oxidized polyethylene (OPE), polyethylene-polypropylene elastomer, ground tire rubber (GTR), isotactic polypropylene (IPP), atactic polypropylene (APP), or any combination thereof.

In some embodiments, the at least one second polymer is present in an amount of 0.1 wt % to 20 wt % based on a total weight of the adhesive formulation.

In some embodiments, the at least one filler is limestone powder.

In some embodiments, a system includes a substrate and an adhesive formulation. In some embodiments, the adhesive formulation is present on at least one surface of the substrate. In some embodiments, the adhesive formulation includes 10 wt % to 70 wt % of a filler, at least one tackifier, or any combination thereof based on a total weight of the adhesive formulation. In some embodiments, the adhesive formulation includes 20 wt % to 70 wt % of at least one process oil based on a total weight of the adhesive formulation. In some embodiments, the adhesive formulation includes 0.1 wt % to 50 wt % of at least one fire retardant based on a total weight of the adhesive formulation. In some embodiments, the adhesive formulation includes 0.5 wt % to 30 wt % of at least one polymer based on a total weight of the adhesive formulation. In some embodiments, the adhesive formulation is free of asphalt or substantially free of asphalt.

In some embodiments, the substrate is a plywood substrate, a glass substrate, a fiberglass substrate, a cellulosic substrate, a shingle, an underlayment, a roofing membrane, a roof deck, a photovoltaic (PV) panel, a modified bitumen (MODBIT) substrate, a rolled good, or any combination thereof.

Covered embodiments are defined by the claims, not the above summary. The above summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Figure 1:
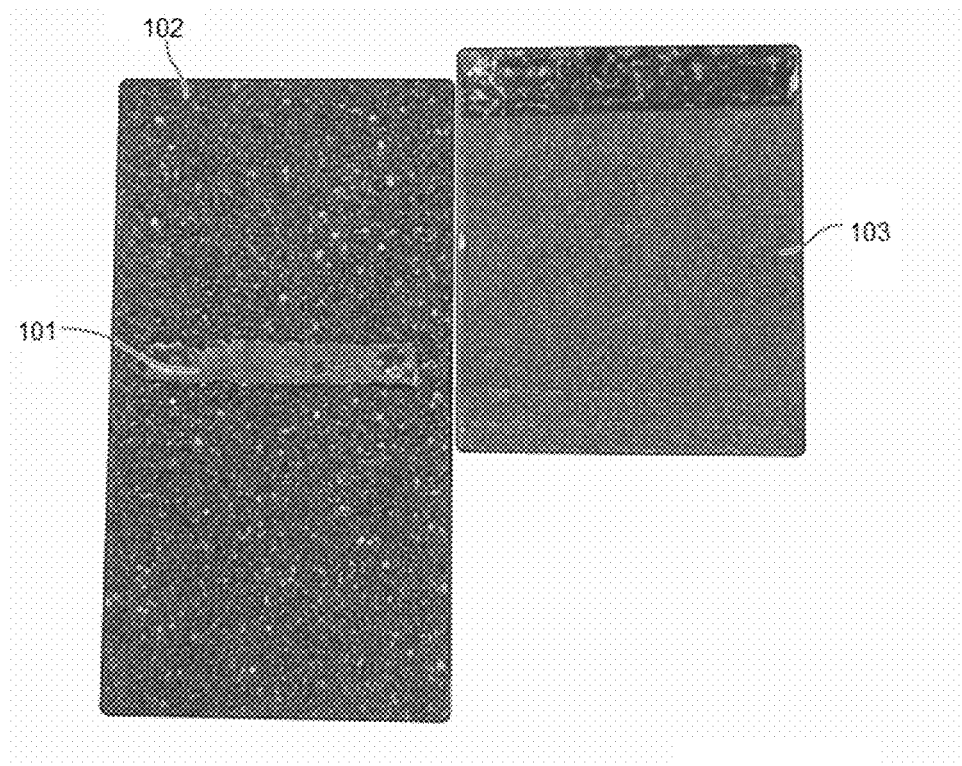
FIG. 1 depicts an exemplary adhesive formulation according to some embodiments of the present disclosure.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Some embodiments of the present disclosure relate to an adhesive formulation that is free of asphalt or substantially free of asphalt.

As used herein, an adhesive formulation is "free of asphalt" when no detectable asphalt is present in the formulation.

As used herein, an adhesive formulation is "substantially free of asphalt" when no more than a specific amount of asphalt is present in the formulation. In some embodiments, the specific amount of asphalt is at most 5% of asphalt by weight based on a total weight of the formulation. In some embodiments, the specific amount of asphalt is at most 1% of asphalt by weight based on a total weight of the formulation. In some embodiments, the specific amount of asphalt is at most 0.5% of asphalt by weight based on a total weight of the formulation. In some embodiments, the specific amount of asphalt is at most 0.05% of asphalt by weight based on a total weight of the formulation. In some embodiments, the specific amount of asphalt is at most 0.005% of asphalt by weight based on a total weight of the formulation. In some embodiments, "substantially free of asphalt" means the amount of asphalt added would not materially change the characteristics of at least one property of the adhesive formulation. In some embodiments, "substantially free of asphalt" means the amount of asphalt added would not materially change the characteristics of at least two properties of the adhesive formulation.

In some embodiments, the adhesive formulation comprises at least one process oil.

In some embodiments, the at least one process oil is chosen from or is selected from the group consisting of: at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), at least one tall oil, or any combination thereof.

In some embodiments, the at least one process oil is chosen from or is selected from the group consisting of at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), or any combination thereof.

In some embodiments, the at least one process oil, comprises, consists essentially of, or consists of at least one tall oil. In some embodiments, the at least one tall oil comprises consists essentially of, or consists of tall oil pitch.

In some embodiments, the adhesive formulation comprises 20 wt % to 70 wt % of the at least one process oil based on a total weight of the adhesive formulation. In some embodiments, the adhesive formulation comprises 30 wt % to 70 wt % of the at least one process oil based on a total weight of the adhesive formulation. In some embodiments, the adhesive formulation comprises 40 wt % to 70 wt % of the at least one process oil based on a total weight of the adhesive formulation. In some embodiments, the adhesive formulation comprises 50 wt % to 70 wt % of the at least one process oil based on a total weight of the adhesive formulation. In some embodiments, the adhesive formulation comprises 60 wt % to 70 wt % of the at least one process oil based on a total weight of the adhesive formulation.

In some embodiments, the adhesive formulation comprises 20 wt % to 60 wt % of the at least one process oil based on a total weight of the adhesive formulation. In some embodiments, the adhesive formulation comprises 20 wt % to 50 wt % of the at least one process oil based on a total weight of the adhesive formulation. In some embodiments, the adhesive formulation comprises 20 wt % to 40 wt % of the at least one process oil based on a total weight of the adhesive formulation. In some embodiments, the adhesive formulation comprises 20 wt % to 30 wt % of the at least one process oil based on a total weight of the adhesive formulation.

In some embodiments, the adhesive formulation comprises 30 wt % to 60 wt % of the at least one process oil based on a total weight of the adhesive formulation. In some embodiments, the adhesive formulation comprises 40 wt % to 50 wt % of the at least one process oil based on a total weight of the adhesive formulation.

In some embodiments, the at least one process oil comprises saturates, aromatics, resins, asphaltenes, or any combination thereof.

In some embodiments, the at least one process oil comprises saturates in an amount ranging from 5 wt % to 99 wt % based on a total weight of the at least one process oil. In some embodiments, the at least one process oil comprises saturates in an amount ranging from 25 wt % to 99 wt % based on a total weight of the at least one process oil. In some embodiments, the at least one process oil comprises saturates in an amount ranging from 50 wt % to 99 wt % based on a total weight of the at least one process oil. In some embodiments, the at least one process oil comprises saturates in an amount ranging from 75 wt % to 99 wt % based on a total weight of the at least one process oil.

In some embodiments, the at least one process oil comprises saturates in an amount ranging from 5 wt % to 75 wt % based on a total weight of the at least one process oil. In some embodiments, the at least one process oil comprises saturates in an amount ranging from 5 wt % to 50 wt % based on a total weight of the at least one process oil. In some embodiments, the at least one process oil comprises saturates in an amount ranging from 5 wt % to 25 wt % based on a total weight of the at least one process oil.

In some embodiments, the at least one process oil comprises saturates in an amount ranging from 25 wt % to 50 wt % based on a total weight of the at least one process oil.

In some embodiments, the at least one process oil comprises aromatics in an amount ranging from 0 wt % to 99 wt % based on a total weight of the at least one process oil. In some embodiments, the at least one process oil comprises aromatics in an amount ranging from 25 wt % to 99 wt % based on a total weight of the at least one process oil. In some embodiments, the at least one process oil comprises aromatics in an amount ranging from 50 wt % to 99 wt % based on a total weight of the at least one process oil. In some embodiments, the at least one process oil comprises aromatics in an amount ranging from 75 wt % to 99 wt % based on a total weight of the at least one process oil.

In some embodiments, the at least one process oil comprises aromatics in an amount ranging from 0 wt % to 75 wt % based on a total weight of the at least one process oil. In some embodiments, the at least one process oil comprises aromatics in an amount ranging from 0 wt % to 50 wt % based on a total weight of the at least one process oil. In some embodiments, the at least one process oil comprises aromatics in an amount ranging from 0 wt % to 25 wt % based on a total weight of the at least one process oil.

In some embodiments, the at least one process oil comprises aromatics in an amount ranging from 25 wt % to 50 wt % based on a total weight of the at least one process oil.

In some embodiments, the at least one process oil comprises resins in an amount ranging from 0 wt % to 25 wt % based on a total weight of the at least one process oil. In some embodiments, the at least one process oil comprises resins in an amount ranging from 10 wt % to 25 wt % based on a total weight of the at least one process oil. In some embodiments, the at least one process oil comprises resins in an amount ranging from 20 wt % to 25 wt % based on a total weight of the at least one process oil.

In some embodiments, the at least one process oil comprises resins in an amount ranging from 0 wt % to 20 wt % based on a total weight of the at least one process oil. In some embodiments, the at least one process oil comprises resins in an amount ranging from 0 wt % to 10 wt % based on a total weight of the at least one process oil.

In some embodiments, the at least one process oil comprises resins in an amount ranging from 10 wt % to 20 wt % based on a total weight of the at least one process oil.

In some embodiments, the at least one process oil comprises asphaltenes in an amount ranging from 0 wt % to 30 wt % based on a total weight of the at least one process oil. In some embodiments, the at least one process oil comprises asphaltenes in an amount ranging from 10 wt % to 30 wt % based on a total weight of the at least one process oil. In some embodiments, the at least one process oil comprises asphaltenes in an amount ranging from 20 wt % to 30 wt % based on a total weight of the at least one process oil.

In some embodiments, the at least one process oil comprises asphaltenes in an amount ranging from 0 wt % to 20 wt % based on a total weight of the at least one process oil. In some embodiments, the at least one process oil comprises asphaltenes in an amount ranging from 0 wt % to 10 wt % based on a total weight of the at least one process oil.

In some embodiments, the at least one process oil comprises asphaltenes in an amount ranging from 10 wt % to 20 wt % based on a total weight of the at least one process oil.

Non-limiting examples of commercially available process oils and exemplary constituents of the commercially available process oils are reproduced below in Table 1.

TABLE 1

Non-limiting Examples of Commercial Process Oils and Constituents thereof:

| Commercial Process Oil | Saturates (wt %) | Aromatics (wt %) | Resins (wt %) | Asphaltenes (wt %) |
|---|---|---|---|---|
| Kendex ® 0866 2010 | 6.7 | 85.7 | 7.5 | 0 |
| Hydrolene ™ H600T | 13.1 | 80.1 | 5.9 | 0.9 |
| Kendex ® 0834 | 10.2 | 69.8 | 13.5 | 6.4 |
| Kendex ® MNE | 41.9 | 56.4 | 1.7 | 0 |
| Kendex ® 0842 | 24.1 | 50.1 | 21.4 | 4.4 |
| Cross ™ Oil L-3500 | 33.9 | 44.8 | 0.7 | 0 |
| Raffene ® 2000 | 53 | 42.6 | 4.4 | 0 |
| Kendex ® 0898 | 42 | 41.5 | 12.7 | 3.8 |
| Kendex ® 0897 | 57.4 | 35.2 | 5.9 | 1.5 |
| Uninap ® 818 | 74.8 | 25.2 | 0 | 0 |
| Hydrolene ™ | 75.9 | 23.3 | 0.8 | 0 |
| Kendex ® 0847 | 73.7 | 22.2 | 2.9 | 0 |
| Safety Kleen ® RHT 240 | 93.3 | 2 | 2.3 | 2.4 |
| Safety Kleen ® (Normal) | 61.1 | 0 | 12.4 | 26.5 |
| Therminol Heating Oil | 97.8 | 0 | 0 | 0 |

In some embodiments, the adhesive formulation comprises at least one polymer.

In some embodiments, the at least one polymer is chosen from or selected from the group consisting of: at least one polyolefin, oxidized polyethylene (OPE), polyethylene-polypropylene elastomer, ground tire rubber (GTR), isotactic polypropylene (IPP), atactic polypropylene (APP), or any combination thereof.

In some embodiments the at least one polymer comprises, consists, or consists essentially of a styrene-butadiene-styrene (SBS) copolymer.

In some embodiments, the at least one polymer is present in an amount of 0.5 wt % to 30 wt % based on a total weight of the adhesive formulation. In some embodiments, the at least one polymer is present in an amount of 1 wt % to 30 wt % based on a total weight of the adhesive formulation. In some embodiments, the at least one polymer is present in an amount of 10 wt % to 30 wt % based on a total weight of the adhesive formulation. In some embodiments, the at least one polymer is present in an amount of 15 wt % to 30 wt % based on a total weight of the adhesive formulation. In some embodiments, the at least one polymer is present in an amount of 20 wt % to 30 wt % based on a total weight of the adhesive formulation. In some embodiments, the at least one polymer is present in an amount of 25 wt % to 30 wt % based on a total weight of the adhesive formulation.

In some embodiments, the at least one polymer is present in an amount of 0.5 wt % to 25 wt % based on a total weight of the adhesive formulation. In some embodiments, the at least one polymer is present in an amount of 0.5 wt % to 20 wt % based on a total weight of the adhesive formulation. In some embodiments, the at least one polymer is present in an amount of 0.5 wt % to 15 wt % based on a total weight of the adhesive formulation. In some embodiments, the at least one polymer is present in an amount of 0.5 wt % to 10 wt % based on a total weight of the adhesive formulation. In some embodiments, the at least one polymer is present in an amount of 0.5 wt % to 5 wt % based on a total weight of the adhesive formulation. In some embodiments, the at least one polymer is present in an amount of 0.5 wt % to 1 wt % based on a total weight of the adhesive formulation.

In some embodiments, the at least one polymer is present in an amount of 1 wt % to 25 wt % based on a total weight of the adhesive formulation. In some embodiments, the at least one polymer is present in an amount of 5 wt % to 20 wt % based on a total weight of the adhesive formulation. In some embodiments, the at least one polymer is present in an amount of 10 wt % to 15 wt % based on a total weight of the adhesive formulation.

In some embodiments, the at least one polymer is at least one first polymer and the adhesive formulation further comprises at least one second polymer.

In some embodiments, the at least one second polymer is chosen from or selected from the group consisting of at least one polyolefin, oxidized polyethylene (OPE), polyethylene-polypropylene elastomer, ground tire rubber (GTR), isotactic polypropylene (IPP), atactic polypropylene (APP), or any combination thereof.

In some embodiments, the at least one second polymer comprises, consists, or consists essentially of a styrene-ethylene-butylene-styrene (SEBS) copolymer.

In some embodiments, the at least one second polymer is present in an amount of 0.1 wt % to 20 wt % based on a total weight of the adhesive formulation. In some embodiments, the at least one second polymer is present in an amount of 1 wt % to 20 wt % based on a total weight of the adhesive formulation. In some embodiments, the at least one second polymer is present in an amount of 5 wt % to 20 wt % based on a total weight of the adhesive formulation. In some embodiments, the at least one second polymer is present in an amount of 10 wt % to 20 wt % based on a total weight of the adhesive formulation. In some embodiments, the at least one second polymer is present in an amount of 15 wt % to 20 wt % based on a total weight of the adhesive formulation.

In some embodiments, the at least one second polymer is present in an amount of 0.1 wt % to 15 wt % based on a total weight of the adhesive formulation. In some embodiments, the at least one second polymer is present in an amount of 0.1 wt % to 10 wt % based on a total weight of the adhesive formulation. In some embodiments, the at least one second polymer is present in an amount of 0.1 wt % to 5 wt % based on a total weight of the adhesive formulation. In some embodiments, the at least one second polymer is present in an amount of 0.1 wt % to 1 wt % based on a total weight of the adhesive formulation.

In some embodiments, the at least one second polymer is present in an amount of 1 wt % to 15 wt % based on a total weight of the adhesive formulation. In some embodiments, the at least one second polymer is present in an amount of 5 wt % to 10 wt % based on a total weight of the adhesive formulation.

In some embodiments, the adhesive formulation further comprises limestone powder.

In some embodiments, the adhesive formulation comprises 10 wt % to 60 wt % of the limestone powder based on a total weight of the adhesive formulation. In some embodiments, the adhesive formulation comprises 20 wt % to 60 wt % of the limestone powder based on a total weight of the adhesive formulation. In some embodiments, the adhesive formulation comprises 30 wt % to 60 wt % of the limestone powder based on a total weight of the adhesive formulation. In some embodiments, the adhesive formulation comprises 40 wt % to 60 wt % of the limestone powder based on a total weight of the adhesive formulation. In some embodiments, the adhesive formulation comprises 50 wt % to 60 wt % of the limestone powder based on a total weight of the adhesive formulation.

In some embodiments, the adhesive formulation comprises 10 wt % to 50 wt % of the limestone powder based on a total weight of the adhesive formulation. In some embodiments, the adhesive formulation comprises 10 wt % to 40 wt % of the limestone powder based on a total weight of the adhesive formulation. In some embodiments, the adhesive formulation comprises 10 wt % to 30 wt % of the limestone powder based on a total weight of the adhesive formulation. In some embodiments, the adhesive formulation comprises 10 wt % to 20 wt % of the limestone powder based on a total weight of the adhesive formulation.

In some embodiments, the adhesive formulation comprises 20 wt % to 50 wt % of the limestone powder based on a total weight of the adhesive formulation. In some embodiments, the adhesive formulation comprises 30 wt % to 40 wt % of the limestone powder based on a total weight of the adhesive formulation.

In some embodiments, the adhesive formulation further comprises at least one tackifier.

In some embodiments, the at least one tackifier is at least one rosin ester. In some embodiments, the at least one rosin ester is at least one pentaerythritol rosin ester. In some embodiments, the at least one rosin ester is at least one glycerol rosin ester.

In some embodiments, the at least one tackifier is chosen from or selected from the group consisting of at least one terpene resin, at least one petroleum resin, at least one hydrogenated rosin, at least one rosin milk, at least one petroleum resin emulsion, at least one terpene-phenolic resin, at least one hydrogenated petroleum resin, at least one aliphatic hydrocarbon resin, at least one hydrogenated aliphatic hydrocarbon resin, at least one aromatic modified aliphatic hydrocarbon resin, at least one hydrogenated aromatic modified aliphatic hydrocarbon resin, at least one polycyclopentadiene resin, at least one hydrogenated polycyclopentadiene resin, at least one cycloaliphatic hydrocarbon resin, at least one hydrogenated cycloaliphatic resin, cycloaliphatic/aromatic hydrocarbon resin, at least one hydrogenated cycloaliphatic/aromatic hydrocarbon resin, hydrogenated aromatic hydrocarbon resin, at least one maleic acid/anhydride modified tackifier, terpene modified aromatic and/or aliphatic hydrocarbon resin, at least one hydrogenated terpene modified aromatic and/or aliphatic hydrocarbon resin, at least one polyterpene resin, at least one hydrogenated polyterpene resin, at least one aromatic modified polyterpene resin, at least one hydrogenated aromatic modified polyterpene resin, at least one terpene-phenol resin, at least one hydrogenated terpene-phenol resin, at least one gum rosin resin, at least one hydrogenated gum rosin resin, at least one gum rosin ester resin, at least one wood rosin resin, at least one hydrogenated wood rosin resin, at least one rosin acid resin, at least one hydrogenated rosin acid resin, or any combination thereof.

In some embodiments, the adhesive formulation comprises 10 wt % to 60 wt % of the tackifier based on a total weight of the adhesive formulation. In some embodiments, the adhesive formulation comprises 20 wt % to 60 wt % of the tackifier based on a total weight of the adhesive formulation. In some embodiments, the adhesive formulation comprises 30 wt % to 60 wt % of the tackifier based on a total weight of the adhesive formulation. In some embodiments, the adhesive formulation comprises 40 wt % to 60 wt % of the tackifier based on a total weight of the adhesive formulation. In some embodiments, the adhesive formulation comprises 50 wt % to 60 wt % of the tackifier based on a total weight of the adhesive formulation.

In some embodiments, the adhesive formulation comprises 10 wt % to 50 wt % of the tackifier based on a total weight of the adhesive formulation. In some embodiments, the adhesive formulation comprises 10 wt % to 40 wt % of the tackifier based on a total weight of the adhesive formulation. In some embodiments, the adhesive formulation comprises 10 wt % to 30 wt % of the tackifier based on a total weight of the adhesive formulation. In some embodiments, the adhesive formulation comprises 10 wt % to 20 wt % of the tackifier based on a total weight of the adhesive formulation.

In some embodiments, the adhesive formulation comprises 20 wt % to 50 wt % of the tackifier based on a total weight of the adhesive formulation. In some embodiments, the adhesive formulation comprises 30 wt % to 40 wt % of the tackifier based on a total weight of the adhesive formulation.

In some embodiments, the adhesive formulation comprises at least one fire retardant.

In some embodiments, the at least one fire retardant comprises colemanite, aluminum trihydrate, magnesium hydroxide, expandable graphite, ammonium polyphosphate, triphenyl phosphate, resorcinol bis(diphenylphosphate), bisphenol A diphenyl phosphate, tricresyl phosphate, dimethyl methylphosphonate, aluminium diethyl phosphinate, decabromodiphenyl ether, decabromodiphenyl ethane, at least one brominated polystyrene, at least one brominated carbonate oligomer, at least one brominated epoxy oligomer, tetrabromophthalic anyhydride, tetrabromobisphenol A, hexabromocyclododecane, antimony trioxide, antimony pentoxide, at least one chlorinated paraffin, huntite, hydromagnesite, red phosphorous, zinc borate, sodium borate, lithium borate, boric acid, tris(1,3-dichloro-2-propyl)phosphate, tetrakis(2-chlorethyl)dichloroisopentyldiphosphate, or any combination thereof.

In some embodiments, the at least one fire retardant is present in an amount of 0.1 wt % to 50 wt % based on a total weight of the adhesive formulation. In some embodiments, the at least one fire retardant is present in an amount of 1 wt % to 50 wt % based on a total weight of the adhesive formulation. In some embodiments, the at least one fire retardant is present in an amount of 5 wt % to 50 wt % based on a total weight of the adhesive formulation. In some embodiments the at least one fire retardant is present in an amount of 10 wt % to 50 wt % based on a total weight of the adhesive formulation. In some embodiments, the at least one fire retardant is present in an amount of 20 wt % to 50 wt % based on a total weight of the adhesive formulation. In some embodiments, the at least one fire retardant is present in an amount of 30 wt % to 50 wt % based on a total weight of the adhesive formulation. In some embodiments, the at least one fire retardant is present in an amount of 40 wt % to 50 wt % based on a total weight of the adhesive formulation. In some embodiments, the at least one fire retardant is present in an amount of 45 wt % to 50 wt % based on a total weight of the adhesive formulation.

In some embodiments, the at least one fire retardant is present in an amount of 0.1 wt % to 45 wt % based on a total weight of the adhesive formulation. In some embodiments the at least one fire retardant is present in an amount of 0.1 wt % to 40 wt % based on a total weight of the adhesive formulation. In some embodiments, the at least one fire retardant is present in an amount of 0.1 wt % to 30 wt % based on a total weight of the adhesive formulation. In some embodiments, the at least one fire retardant is present in an amount of 0.1 wt % to 20 wt % based on a total weight of the adhesive formulation. In some embodiments, the at least one fire retardant is present in an amount of 0.1 wt % to 10 wt % based on a total weight of the adhesive formulation. In some embodiments, the at least one fire retardant is present in an amount of 0.1 wt % to 5 wt % based on a total weight of the adhesive formulation. In some embodiments, the at least one fire retardant is present in an amount of 0.1 wt % to 1 wt % based on a total weight of the adhesive formulation.

In some embodiments, the at least one fire retardant is present in an amount of 1 wt % to 45 wt % based on a total weight of the adhesive formulation. In some embodiments, the at least one fire retardant is present in an amount of 5 wt % to 40 wt % based on a total weight of the adhesive formulation. In some embodiments, the at least one fire retardant is present in an amount of 10 wt % to 30 wt % based on a total weight of the adhesive formulation. In some embodiments, the at least one fire retardant is present in an amount of 20 wt % to 30 wt % based on a total weight of the adhesive formulation. In some embodiments, the at least one fire retardant is present in an amount of 10 wt % to 20 wt % based on a total weight of the adhesive formulation.

In some embodiments, the adhesive formulation further comprises at least one filler.

In some embodiments, the at least one filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, or any combination thereof.

In some embodiments, the at least one filler is present in an amount ranging from 0.00001% to 70% by weight of the adhesive formulation. In some embodiments, the at least one filler is present in an amount ranging from 0.0001% to 70% by weight of the adhesive formulation. In some embodiments, the at least one filler is present in an amount ranging from 0.001% to 70% by weight of the adhesive formulation. In some embodiments, the at least one filler is present in an amount ranging from 0.01% to 70% by weight of the adhesive formulation. In some embodiments, the at least one filler is present in an amount ranging from 0.1% to 70% by weight of the adhesive formulation. In some embodiments, the at least one filler is present in an amount ranging from 1% to 70% by weight of the adhesive formulation. In some embodiments, the at least one filler is present in an amount ranging from 10% to 70% by weight of the adhesive formulation. In some embodiments, the at least one filler is present in an amount ranging from 20% to 70% by weight of the adhesive formulation. In some embodiments, the at least one filler is present in an amount ranging from 30% to 70% by weight of the adhesive formulation. In some embodiments, the at least one filler is present in an amount ranging from 40% to 70% by weight of the adhesive formulation. In some embodiments, the at least one filler is present in an amount ranging from 50% to 70% by weight of the adhesive formulation. In some embodiments, the at least one filler is present in an amount ranging from 60% to 70% by weight of the adhesive formulation.

In some embodiments, the at least one filler is present in an amount ranging from 0.00001% to 60% of the adhesive formulation. In some embodiments, the at least one filler is present in an amount ranging from 0.00001% to 50% by weight of the adhesive formulation. In some embodiments, the at least one filler is present in an amount ranging from 0.00001% to 40% by weight of the adhesive formulation. In some embodiments, the at least one filler is present in an amount ranging from 0.00001% to 30% by weight of the adhesive formulation. In some embodiments, the at least one filler is present in an amount ranging from 0.00001% to 20% by weight of the adhesive formulation. In some embodiments, the at least one filler is present in an amount ranging from 0.00001% to 10% by weight of the adhesive formulation. In some embodiments, the at least one filler is present in an amount ranging from 0.00001% to 1% by weight of the adhesive formulation. In some embodiments, the at least one filler is present in an amount ranging from 0.00001% to 0.1% by weight of the adhesive formulation. In some embodiments, the at least one filler is present in an amount ranging from 0.00001% to 0.01% by weight of the adhesive formulation. In some embodiments, the at least one filler is present in an amount ranging from 0.00001% to 0.001% by weight of the adhesive formulation. In some embodiments, the at least one filler is present in an amount ranging from 0.00001% to 0.0001% by weight of the adhesive formulation.

In some embodiments, the at least one filler is present in an amount ranging from 0.0001% to 60% by weight of the adhesive formulation. In some embodiments, the at least one filler is present in an amount ranging from 0.001% to 50% by weight of the adhesive formulation. In some embodiments, the at least one filler is present in an amount ranging from 0.01% to 40% by weight of the adhesive formulation. In some embodiments, the at least one filler is present in an amount ranging from 0.1% to 30% by weight of the adhesive formulation. In some embodiments, the at least one filler is present in an amount ranging from 1% to 20% by weight of the adhesive formulation. In some embodiments, the at least one filler is present in an amount ranging from 5% to 10% by weight of the adhesive formulation.

In some embodiments, the adhesive formulation further comprises at least one additive. In some embodiments, the at least one additive is at least one wax, at least one antioxidant, ethylene-bis-stearamide (EBS), or any combination thereof.

In some embodiments, the at least one additive is present in an amount ranging from 0.00001% to 70% by weight of the adhesive formulation. In some embodiments, the at least one additive is present in an amount ranging from 0.0001% to 70% by weight of the adhesive formulation. In some embodiments, the at least one additive is present in an amount ranging from 0.001% to 70% by weight of the adhesive formulation. In some embodiments, the at least one additive is present in an amount ranging from 0.01% to 70% by weight of the adhesive formulation. In some embodiments, the at least one additive is present in an amount ranging from 0.1% to 70% by weight of the adhesive formulation. In some embodiments, the at least one additive is present in an amount ranging from 1% to 70% by weight of the adhesive formulation. In some embodiments, the at least one additive is present in an amount ranging from 10% to 70% by weight of the adhesive formulation. In some embodiments, the at least one additive is present in an amount ranging from 20% to 70% by weight of the adhesive formulation. In some embodiments, the at least one additive is present in an amount ranging from 30% to 70% by weight of the adhesive formulation. In some embodiments, the at least one additive is present in an amount ranging from 40% to 70% by weight of the adhesive formulation. In some embodiments, the at least one additive is present in an formulation. In some embodiments, the at least one additive is present in an amount ranging from 60% to 70% by weight of the adhesive formulation.

In some embodiments, the at least one additive is present in an amount ranging from 0.00001% to 60% of the adhesive formulation. In some embodiments, the at least one additive is present in an amount ranging from 0.00001% to 50% by weight of the adhesive formulation. In some embodiments, the at least one additive is present in an amount ranging from 0.00001% to 40% by weight of the adhesive formulation. In some embodiments, the at least one additive is present in an amount ranging from 0.00001% to 30% by weight of the adhesive formulation. In some embodiments, the at least one additive is present in an amount ranging from 0.00001% to 20% by weight of the adhesive formulation. In some embodiments, the at least one additive is present in an amount ranging from 0.00001% to 10% by weight of the adhesive formulation. In some embodiments, the at least one additive is present in an amount ranging from 0.00001% to 1% by weight of the adhesive formulation. In some embodiments, the at least one additive is present in an amount ranging from 0.00001% to 0.1% by weight of the adhesive formulation. In some embodiments, the at least one additive is present in an amount ranging from 0.00001% to 0.01% by weight of the adhesive formulation. In some embodiments, the at least one additive is present in an amount ranging from 0.00001% to 0.001% by weight of the adhesive formulation. In some embodiments, the at least one additive is present in an amount ranging from 0.00001% to 0.0001% by weight of the adhesive formulation.

In some embodiments, the at least one additive is present in an amount ranging from 0.0001% to 60% by weight of the adhesive formulation. In some embodiments, the at least one additive is present in an amount ranging from 0.001% to 50% by weight of the adhesive formulation. In some embodiments, the at least one additive is present in an amount ranging from 0.01% to 40% by weight of the adhesive formulation. In some embodiments, the at least one additive is present in an amount ranging from 0.1% to 30% by weight of the adhesive formulation. In some embodiments, the at least one additive is present in an amount ranging from 1% to 20% by weight of the adhesive formulation. In some embodiments, the at least one additive is present in an amount ranging from 5% to 10% by weight of the adhesive formulation.

In some embodiments, the adhesive achieves at least a passing grade when tested according to ASTM D1970 at a predetermined test temperature In some embodiments, the passing grade under ASTM D1970 is 1 lb/ft at the predetermined test temperature of 40° F. In some embodiments, the passing grade under ASTM D1970 is 2 lb/ft at the predetermined test temperature of 40° F. In some embodiments, the passing grade under ASTM D1970 is 3 lb/ft at the predetermined test temperature of 40° F. In some embodiments, the passing grade under ASTM D1970 is 4 lb/ft at the predetermined test temperature of 40° F. In some embodiments, the passing grade under ASTM D1970 is 5 lb/ft at the predetermined test temperature of 40° F.

In some embodiments, the passing grade under ASTM D1970 is 10 lb/ft at the predetermined test temperature of 75° F. In some embodiments, the passing grade under ASTM D1970 is 11 lb/ft at the predetermined test temperature of 75° F. In some embodiments, the passing grade under ASTM D1970 is 12 lb/ft at the predetermined test temperature of 75° F. In some embodiments, the passing grade under ASTM D1970 is 13 lb/ft at the predetermined test temperature of 75° F. In some embodiments, the passing grade under ASTM D1970 is 14 lb/ft at the predetermined test temperature of 75° F. In some embodiments, the passing grade under ASTM D1970 is 15 lb/ft at the predetermined test temperature of 75° F.

In some embodiments, the adhesive formulation achieves a mechanical uplift of at least 20 lb/ft when tested according to ASTM D6381 after being conditioned at 140° F. for 16 hours. In some embodiments, the adhesive formulation achieves a mechanical uplift of at least 30 lb/ft when tested according to ASTM D6381 after being conditioned at 140° F. for 16 hours. In some embodiments, the adhesive formulation achieves a mechanical uplift of at least 40 lb/ft when tested according to ASTM D6381 after being conditioned at 140° F. for 16 hours. In some embodiments, the adhesive formulation achieves a mechanical uplift of at least 50 lb/ft when tested according to ASTM D6381 after being conditioned at 140° F. for 16 hours. In some embodiments, the adhesive formulation achieves a mechanical uplift of at least 60 lb/ft when tested according to ASTM D6381 after being conditioned at 140° F. for 16 hours. In some embodiments, the adhesive formulation achieves a mechanical uplift of at least 60 lb/ft when tested according to ASTM D6381 after being conditioned at 140° F. for 16 hours. In some embodiments, the adhesive formulation achieves a mechanical uplift of at least 70 lb/ft when tested according to ASTM D6381 after being conditioned at 140° F. for 16 hours. In some embodiments, the adhesive formulation achieves a mechanical uplift of at least 80 lb/ft when tested according to ASTM D6381 after being conditioned at 140° F. for 16 hours. In some embodiments, the adhesive formulation achieves a mechanical uplift of at least 90 lb/ft when tested according to ASTM D6381 after being conditioned at 140° F. for 16 hours.

In some embodiments, the adhesive formulation achieves a mechanical uplift of 20 lb/ft to 100 lb/ft when tested according to ASTM D6381 after being conditioned at 140° F. for 16 hours. In some embodiments, the adhesive formulation achieves a mechanical uplift of 30 lb/ft to 100 lb/ft when tested according to ASTM D6381 after being conditioned at 140° F. for 16 hours. In some embodiments, the adhesive formulation achieves a mechanical uplift of 40 lb/ft to 100 lb/ft when tested according to ASTM D6381 after being conditioned at 140° F. for 16 hours. In some embodiments, the adhesive formulation achieves a mechanical uplift of 50 lb/ft to 100 lb/ft when tested according to ASTM D6381 after being conditioned at 140° F. for 16 hours. In some embodiments, the adhesive formulation achieves a mechanical uplift of 60 lb/ft to 100 lb/ft when tested according to ASTM D6381 after being conditioned at 140° F. for 16 hours. In some embodiments, the adhesive formulation achieves a mechanical uplift of 70 lb/ft to 100 lb/ft when tested according to ASTM D6381 after being conditioned at 140° F. for 16 hours. In some embodiments, the adhesive formulation achieves a mechanical uplift of 80 lb/ft to 100 lb/ft when tested according to ASTM D6381 after being conditioned at 140° F. for 16 hours. In some embodiments, the adhesive formulation achieves a mechanical uplift of 90 lb/ft to 100 lb/ft when tested according to ASTM D6381 after being conditioned at 140° F. for 16 hours.

In some embodiments, the adhesive formulation achieves a mechanical uplift of 20 lb/ft to 90 lb/ft when tested according to ASTM D6381 after being conditioned at 140° F. for 16 hours. In some embodiments, the adhesive formulation achieves a mechanical uplift of 20 lb/ft to 80 lb/ft when tested according to ASTM D6381 after being conditioned at 140° F. for 16 hours. In some embodiments, the adhesive formulation achieves a mechanical uplift of 20 lb/ft to 70 lb/ft when tested according to ASTM D6381 after being conditioned at 140° F. for 16 hours. In some embodiments, the adhesive formulation achieves a mechanical uplift of 20 lb/ft to 60 lb/ft when tested according to ASTM D6381 after being conditioned at 140° F. for 16 hours. In some embodiments, the adhesive formulation achieves a mechanical uplift of 20 lb/ft to 50 lb/ft when tested according to ASTM D6381 after being conditioned at 140° F. for 16 hours. In some embodiments, the adhesive formulation achieves a mechanical uplift of 20 lb/ft to 40 lb/ft when tested according to ASTM D6381 after being conditioned at 140° F. for 16 hours. In some embodiments, the adhesive formulation achieves a mechanical uplift of 20 lb/ft to 30 lb/ft when tested according to ASTM D6381 after being conditioned at 140° F. for 16 hours.

In some embodiments, the adhesive formulation achieves a mechanical uplift of 30 lb/ft to 90 lb/ft when tested according to ASTM D6381 after being conditioned at 140° F. for 16 hours. In some embodiments, the adhesive formulation achieves a mechanical uplift of 40 lb/ft to 80 lb/ft when tested according to ASTM D6381 after being conditioned at 140° F. for 16 hours. In some embodiments, the adhesive formulation achieves a mechanical uplift of 50 lb/ft to 70 lb/ft when tested according to ASTM D6381 after being conditioned at 140° F. for 16 hours.

In some embodiments, the adhesive formulation may exhibit a specified activation temperature. As used herein, "activation temperature" is the minimum temperature at which the value of tan δ of a given formulation exceeds 1; where tan δ0 is a ratio of G" to G', where G" is the loss modulus of a given formulation, and where G' is the storage modulus of the same formulation. In some embodiments, a tan δ0 value of greater than 1 indicates that an adhesive formulation is present at a sufficient temperature to form a bond with a material.

In some embodiments, the adhesive formulation may exhibit an activation temperature of 15° F. to 60° F. In some embodiments, the adhesive formulation may exhibit an activation temperature of 30° F. to 60° F. In some embodiments, the adhesive formulation may exhibit an activation temperature of 45° F. to 60° F.

In some embodiments, the adhesive formulation may exhibit an activation temperature of 15° F. to 45° F. In some embodiments, the adhesive formulation may exhibit an activation temperature of 15° F. to 30° F.

In some embodiments, the adhesive formulation may exhibit an activation temperature of 30° F. to 45° F.

In some embodiments, the adhesive formulation may exhibit a specified Dahlquist Criterion Temperature. As used herein, the "Dahlquist Criterion Temperature" is the minimum temperature at which a given formulation achieves a G' (i.e., storage modulus) of greater than 300 kPa. The Dahlquist criterion temperature is measured herein pursuant to the procedures discussed in Ir. Roelof Luth, "Defining Viscoelastic Adhesive Coordinates that Matter," https://www.pstc.org/files/public/Luth_Roelof.pdf, which is incorporated by reference herein in its entirety for all purposes.

In some embodiments, the adhesive formulation exhibits a Dahlquist Criterion Temperature of 35° F. to 65° F. In some embodiments, the adhesive formulation exhibits a Dahlquist Criterion Temperature of 45° F. to 65° F. In some embodiments, the adhesive formulation exhibits a Dahlquist Criterion Temperature of 55° F. to 65° F.

In some embodiments, the adhesive formulation exhibits a Dahlquist Criterion Temperature of 35° F. to 55° F. In some embodiments, the adhesive formulation exhibits a Dahlquist Criterion Temperature of 35° F. to 45° F.

In some embodiments, the adhesive formulation exhibits a Dahlquist Criterion Temperature of 45° F. to 55° F.

In some embodiments, the adhesive formulation may exhibit a specified peel strength. As used herein, "peel strength" is measured is measured according to the procedure discussed in F. A. Mazzeo, "Characterization of Pressure Sensitive Adhesives by Rheology," TA Instruments Report RH082 (2002), pages 1-8, which is referenced by S. Sun et al., "A review of mechanical properties of pressure sensitive adhesives," International Journal of Adhesion and Adhesives, 41 (2013), pages 98-106, both of which are incorporated by reference herein in their respective entireties for all purposes.

In some embodiments, the adhesive formulation has a peel strength of 7.5 MPa to 50 MPa measured at 25° C. In some embodiments, the adhesive formulation has a peel strength of 15 MPa to 50 MPa measured at 25° C. In some embodiments, the adhesive formulation has a peel strength of 25 MPa to 50 MPa measured at 25° C. In some embodiments, the adhesive formulation has a peel strength of 45 MPa to 50 MPa measured at 25° C.

In some embodiments, the adhesive formulation has a peel strength of 15 MPa to 50 MPa measured at 25° C. In some embodiments, the adhesive formulation has a peel strength of 25 MPa to 50 MPa measured at 25° C. In some embodiments, the adhesive formulation has a peel strength of 45 MPa to 50 MPa measured at 25° C.

In some embodiments, the adhesive formulation has a peel strength of 15 MPa to 45 MPa measured at 25° C. In some embodiments, the adhesive formulation has a peel strength of 25 MPa to 45 MPa measured at 25° C.

Some embodiments of the present disclosure relate to a method of making an adhesive that is free or substantially free of asphalt.

In some embodiments, the method comprises combining at least one process oil and at least one polymer. In some embodiments, the method comprises combining limestone powder with at least one process oil and at least one polymer. In some embodiments, the method comprises combining at least one tackifier with at least one process oil and at least one polymer. In some embodiments, the method comprises combining at least one tackifier with limestone powder, at least one process oil and at least one polymer. In some embodiments the components of an adhesive formulation are combined sequentially, all at once, or any combination thereof. In some embodiments, the method comprises forming the adhesive formulation into a flowable adhesive formulation.

In some embodiments, the flowable adhesive formulation is an adhesive formulation that has a viscosity of 1,000 cP to 10,000 cP tested at 374° F., using a Brookfield viscometer with spindle number LV-4, and a viscometer speed of 60 RPM. In some embodiments, the flowable adhesive formulation is an adhesive formulation that has a viscosity of 2,000 cP to 10,000 cP tested at 374° F., using a Brookfield viscometer with spindle number LV-4, and a viscometer speed of 60 RPM. In some embodiments, the flowable adhesive formulation is an adhesive formulation that has a viscosity of 5,000 cP to 10,000 cP tested at 374° F., using a Brookfield viscometer with spindle number LV-4, and a viscometer speed of 60 RPM. In some embodiments, the flowable adhesive formulation is an adhesive formulation that has a viscosity of 9,000 cP to 10,000 cP tested at 374° F., using a Brookfield viscometer with spindle number LV-4, and a viscometer speed of 60 RPM.

In some embodiments, the flowable adhesive formulation is an adhesive formulation that has a viscosity of 1,000 cP to 9,000 cP tested at 374° F., using a Brookfield viscometer with spindle number LV-4, and a viscometer speed of 60 RPM. In some embodiments, the flowable adhesive formulation is an adhesive formulation that has a viscosity of 1,000 cP to 5,000 cP tested at 374° F., using a Brookfield viscometer with spindle number LV-4, and a viscometer speed of 60 RPM. In some embodiments, the flowable adhesive formulation is an adhesive formulation that has a viscosity of 1,000 cP to 2,000 cP tested at 374° F., using a Brookfield viscometer with spindle number LV-4, and a viscometer speed of 60 RPM.

In some embodiments, the flowable adhesive formulation is an adhesive formulation that has a viscosity of 2,000 cP to 9,000 cP tested at 374° F., using a Brookfield viscometer with spindle number LV-4, and a viscometer speed of 60 RPM. In some embodiments, the flowable adhesive formulation is an adhesive formulation that has a viscosity of 5,000 cP tested at 374° F., using a Brookfield viscometer with spindle number LV-4, and a viscometer speed of 60 RPM.

In some embodiments, the flowable adhesive formulation is an adhesive formulation that has a viscosity of 10,000 cP to 30,000 cP tested at 374° F., using a Brookfield viscometer with spindle number LV-4, and a viscometer speed of 30 RPM. In some embodiments, the flowable adhesive formulation is an adhesive formulation that has a viscosity of 15,000 cP to 30,000 cP tested at 374° F., using a Brookfield viscometer with spindle number LV-4, and a viscometer speed of 30 RPM. In some embodiments, the flowable adhesive formulation is an adhesive formulation that has a viscosity of 20,000 cP to 30,000 cP tested at 374° F., using a Brookfield viscometer with spindle number LV-4, and a viscometer speed of 30 RPM. In some embodiments, the flowable adhesive formulation is an adhesive formulation that has a viscosity of 25,000 cP to 30,000 cP tested at 374° F., using a Brookfield viscometer with spindle number LV-4, and a viscometer speed of 30 RPM.

In some embodiments, the flowable adhesive formulation is an adhesive formulation that has a viscosity of 10,000 cP to 25,000 cP tested at 374° F., using a Brookfield viscometer with spindle number LV-4, and a viscometer speed of 30 RPM. In some embodiments, the flowable adhesive formulation is an adhesive formulation that has a viscosity of 10,000 cP to 20,000 cP tested at 374° F., using a Brookfield viscometer with spindle number LV-4, and a viscometer speed of 30 RPM. In some embodiments, the flowable adhesive formulation is an adhesive formulation that has a viscosity of 10,000 cP to 15,000 cP tested at 374° F., using a Brookfield viscometer with spindle number LV-4, and a viscometer speed of 30 RPM.

In some embodiments, the flowable adhesive formulation is an adhesive formulation that has a viscosity of 15,000 cP to 25,000 cP tested at 374° F., using a Brookfield viscometer with spindle number LV-4, and a viscometer speed of 30 RPM. In some embodiments, the flowable adhesive formulation is an adhesive formulation that has a viscosity of 20,000 cP tested at 374° F., using a Brookfield viscometer with spindle number LV-4, and a viscometer speed of 30 RPM.

In some embodiments, the forming of the flowable adhesive formulation comprises heating the adhesive formulation to a temperature of 300° F. to 400° F. In some embodiments, the forming of the flowable adhesive formulation comprises heating the adhesive formulation to a temperature of 325° F. to 400° F. In some embodiments, the forming of the flowable adhesive formulation comprises heating the adhesive formulation to a temperature of 350° F. to 400° F. In some embodiments, the forming of the flowable adhesive formulation comprises heating the adhesive formulation to a temperature of 375° F. to 400° F.

In some embodiments, the forming of the flowable adhesive formulation comprises heating the adhesive formulation to a temperature of 300° F. to 375° F. In some embodiments, the forming of the flowable adhesive formulation comprises heating the adhesive formulation to a temperature of 300° F. to 350° F. In some embodiments, the forming of the flowable adhesive formulation comprises heating the adhesive formulation to a temperature of 300° F. to 325° F.

In some embodiments, the forming of the flowable adhesive formulation comprises heating the adhesive formulation to a temperature of 325° F. to 375° F. In some embodiments, the forming of the flowable adhesive formulation comprises heating the adhesive formulation to a temperature of 350° F.

Some embodiments of the present disclosure relate to a method of using an adhesive formulation that is free or substantially free of asphalt.

In some embodiments, the method comprises applying the adhesive formulation to at least one surface of a substrate. In some embodiments, the substrate is a roof substrate. In some embodiments, the substrate or roof substrate is a plywood substrate, a glass substrate, a fiberglass substrate, (e.g., a fiberglass mat), a cellulosic substrate, a shingle (e.g., a roofing shingle), an underlayment, a roofing membrane (e.g., a thermoplastic polyolefin (TPO) or polyvinyl chloride (PVC) membrane), a roof deck, a photovoltaic (PV) panel, a modified bitumen (MODBIT) substrate, an ethylene tetrafluoroethylene (ETFE) substrate, a roll good, or any combination thereof.

In some embodiments, the method comprises using the adhesive formulation to seal a leak. In some embodiments, the leak is present on a surface of a substrate (such as but not limited to a roof substrate), between multiple surfaces of a substrate (such as but not limited to a roof substrate), between multiple substrates or any combination thereof. In some embodiments, the leak is present between two surfaces of a substrate. In some embodiments, the leak is present between three surfaces of a substrate. In some embodiments, the leak is present between four surfaces of a substrate. In some embodiments, the leak is present between two substrates. In some embodiments, the leak is present between three substrates. In some embodiments, the leak is present between four substrates.

In some embodiments, the method further comprises forming the adhesive formulation into at least one adhesive sheet, forming the adhesive into at least one adhesive strip, or any combination thereof. In some embodiments, the forming of the adhesive formulation into at least one adhesive sheet, the forming the adhesive into at least one adhesive strip, or any combination thereof comprises casting the adhesive formulation into the at least one adhesive sheet, casting the adhesive formulation into the at least one adhesive strip, or any combination thereof. In some embodiments, the casting is performed with a roller mill.

For instance, as shown in FIG. 1, an exemplary adhesive formulation may take the form of a strip 101. In some embodiments, the strip 101 may be bonded to substrate 102. In some embodiments, the strip 101 may bond substrate 102 to second substrate 103.

Some embodiments of the present disclosure relate to a system comprising a substrate and an adhesive formulation that is present on at least one surface of the substrate, where the adhesive formulation is free or substantially free of asphalt. In some embodiments, the substrate is any substrate described herein. In some embodiments, the system comprises multiple substrates, such as but not limited to, any combination of substrates described herein.

In some embodiments, the first substrate and the second substrate are the same. In some embodiments, the first substrate and the second substrate are different. In some embodiments, the first roofing substrate, the second roofing substrate, or any combination thereof is a roofing shingle.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the phrase "consisting essentially of" limits the scope of a specific claim to the specified materials or steps and those that do not materially affect the basic and novel characteristic or characteristics of the specific claim. In one non-limiting example, a specific claim reciting "consisting essentially of" allows for the addition of a non-recited claim element, so long as the non-recited claim element is "free or substantially free of asphalt," as defined herein. In another non-limiting example, a specific claim reciting "consisting essentially of" allows for the addition of a non-recited claim element, so long as the non-recited claim element achieves a mechanical uplift of at least 20 lb/ft when tested according to ASTM D6381 after being conditioned at 140° F. for 16 hours, wherein the adhesive formulation achieves at least a passing grade of 2 lb/ft when tested according to ASTM D1970 at a specific test temperature of 40° F., wherein the adhesive formulation achieves at least a passing grade of 12 lb/ft when tested according to ASTM D1970 at a specific test temperature of 75° F., or any combination thereof. As used herein and when used in the context of a claim reciting the term "consisting essentially of," the term "optionally" denotes a non-limiting example of a claim element that does not materially affect the basic and novel characteristic or characteristics of the specific claim.

As used herein, terms such as "consisting of" and "composed of" limit the scope of a specific claim to the materials and steps recited by the claim.

EXAMPLE 1

At least one process oil was blended with at least one polymer in a high shear mixer until smooth and then transferred to a paddle mixer, where limestone powder was added. In some samples, additional components, such as but not limited to filler(s) and additive(s) were also added. The resulting adhesive formulations, which were free of asphalt, were cast in between 2 mil rollers with release paper on both sides. The adhesive formulations were poured on a 1.88 lbs/100 sq. ft nonwoven glass mat substrate for a topcoat of the adhesive formulation at 10 mils and then poured between the 2 mil rollers on the back side for another 10 mils to make the bottom coat, thereby forming an adhesive substrate. For an adhesive substrate having a single coat construction, the same compound was used to pour the top and back of the adhesive substrate. For a dual coat construction, the topcoat was a different adhesive formulation than the bottom coat. The finished adhesive substrates were then cooled, cut and tested for ASTM D1970 plywood peel adhesion at three different conditions (40° F., 73° F. and 140° F.). A portion of each adhesive substrate was also put into a 120° F. convection oven to condition for 2 weeks and then tested for plywood adhesion to obtain aged peel values under ASTM D1970. Results are shown in Tables 1A and 1B below.

TABLE 1A

| Component | Unit | Formulation 1 | Formulation 2 | Formulation 3 (dual coat applied to Plywood in ASTM test) | |
|---|---|---|---|---|---|
| | | | | Coat 1 | Coat 2 |
| Asphalt Flux (CAS# 8052-42-4) | wt. % | 0 | 0 | 0 | 0 |
| Bright Stock Extract | wt. % | 55 | 53 | 40 | 50 |
| Isotactic Polypropylene | wt. % | 0 | 0 | 0 | 0 |
| SBS Copolymer (Radial Block) | wt. % | 10 | 12 | 5 | 10 |
| Limestone | wt. % | 35 | 35 | 55 | 40 |
| Viscosity @ 374 F. (LVT) | cP | 2200 | 6400 | 1500 | 3800 |
| ASTM D1970 180° Plywood Peel Tested @ 40 F. | lb./ft. | 104.8 ± 7.6 | 55.8 ± 6.9 | 54 ± 19 | |
| ASTM D1970 180° Plywood Peel Tested @ 73 F. | lb./ft. | 36.8 ± 8.9 | 6.7 ± 3.2 | 6 ± 1.2 | |
| ASTM D1970 180° Plywood Peel Tested @ 140 F. | lb./ft. | 6.9 ± 2.1 | 1.5 ± .9 | 3.5 ± 1.9 | |

TABLE 1B

| Component | Unit | Formulation 4 | Formulation 5 | Formulation 6 | Formulation 7 |
|---|---|---|---|---|---|
| Asphalt Flux (CAS# 8052-42-4) | wt. % | 0 | 0 | 0 | 0 |
| Bright Stock Extract | wt. % | 50 | 53 | 45 | 40 |
| Isotactic Polypropylene | wt. % | 0 | 2 | 0 | 0 |
| SBS | wt. % | 10 | 10 | 10 | 10 |

TABLE 1B-continued

| Component | Unit | Formulation 4 | Formulation 5 | Formulation 6 | Formulation 7 |
|---|---|---|---|---|---|
| Copolymer (Radial Block) | | | | | |
| Limestone | wt. % | 40 | 35 | 45 | 50 |
| Viscosity @ 374 F. (LVT) | cP | 4300 | 5400 | 8300 | 6900 |
| ASTM D1970 180° Plywood Peel Tested @ 40 F. | lb./ft. | 87.8 ± 13.2 | 82.4 ± 14.2 | 69.2 ± 7.4 | 64.1 ± 9.3 |
| ASTM D1970 180° Plywood Peel Tested @ 73 F. | lb./ft. | 30.1 ± 3.4 | 37.8 ± 3.4 | 23.5 ± 4.5 | 19.8 ± 2.5 |
| ASTM D1970 180° Plywood Peel Tested @ 140 F. | lb./ft. | 10.1 ± 2.3 | 4.4 ± 1.7 | 10.5 ± 1.9 | 4.3 ± 1.4 |

COMPARATIVE EXAMPLE 1

The same steps of Example 1 were performed except that the adhesive formulations were comparative formulations that included asphalt. Results are shown in Table 1C below.

TABLE 1C

| Component | Unit | Comparative Formulation 1 | Comparative Formulation 2 | Comparative Formulation 3 |
|---|---|---|---|---|
| Asphalt Flux (CAS# 8052-42-4) | wt. % | 77 | 57 | 43 |
| Bright Stock Extract | wt. % | 0 | 0 | 0 |
| Isotactic Polypropylene | wt. % | 0 | 0 | 0 |
| SBS Copolymer (Radial Block) | wt. % | 8 | 8 | 7 |
| Limestone | wt. % | 15 | 35 | 50 |
| Viscosity @ 374 F. (LVT) | cP | 2100 | 14000 | 260000 |
| ASTM D1970 180° Plywood Peel Tested @ 40 F. | lb./ft. | 80 ± 6 | 27.6 ± 12.9 | 4 |
| ASTM D1970 180° Plywood Peel Tested @ 73 F. | lb./ft. | 52 ± 14 | 46.4 ± 15.4 | 0 |
| ASTM D1970 180° Plywood Peel Tested @ 140 F. | lb./ft. | 2.5 ± .5 | 1.6 ± .7 | 0 |

EXAMPLE 2

An additional exemplary formulation "Formulation 8," that was free or substantially free of asphalt, included the following components—44% Sylfat DP-8 (tall oil pitch, low sterols); 44% Sylvatac RE-98 (pentaerythritol rosin esters); 10% D-1184 KT (radial SBS polymer); and 2% G-1650 (linear SEBS polymer).

The formulation was prepared using the following procedure.

A high shear (Silverson) mixing set-up was assembled, along with a quart can-sized heating mantle and temperature controller. To the quart can, 310.70 g of Sylfat DP-8 (Kraton®) Chemical) was added. The can was inserted into the heating mantle, and the mixing head was immersed into the tall oil pitch. A thermocouple attached to the temperature controller was inserted into the tall oil pitch. The mixer was set to a speed of 250-500 rpm and the temperature controller was set to a target temperature of 180° C. Once the temperature reached 180° C., 310.74 g of Sylvatac RE-98 (Kraton® Chemical) was slowly added into the DP-8 with continuous mixing. After the RE-98 was incorporated into the blend, the mixing speed was increased to 2500-3000 rpm and 70.64 g of D-1184 (Kraton® Polymer) was slowly added into the liquid. Afterwards, 14.12 g of G-1650 (Kraton® Polymer) was slowly added to the mixture. Mixing at 2500 to 3000 rpm was continued for 1 hour. The can was then removed from the high shear mixing set-up. The can was transferred to a heating mantle attached to a temperature controller and a low shear mixer set-up was put together above it. A paddle blade was immersed into the liquid and a thermocouple was inserted into the liquid. Mixing was maintained between 500-600 rpm and the temperature was kept at 180° C. for 3 hours, for a total of 4 hours of combined mixing at one or more mixing speeds chosen from 250-600 rpm, 2500-3000 rpm, or any combination thereof. The sample can was removed from the mixing and heating set-up and samples were prepared for testing.

An additional exemplary formulation "Formulation 9," that was free or substantially free of asphalt, contained the following components-44% Sylfat DP-1 (tall oil pitch), 44% Dertoline P110 (maleated pentaerythritol rosin esters), 10% D-1184 (radial SBS polymer), 2% G-1650 (linear SEBS polymer).

The formulation was prepared using the following procedure.

A high shear (Silverson) mixing set-up was assembled, along with a quart can-sized heating mantle and temperature controller. To the quart can, 316.12 g of Sylfat DP-1 (Kraton Chemical) was added. The can was inserted into the heating mantle, and the mixing head was immersed into the tall oil pitch. A thermocouple attached to the temperature controller was inserted into the tall oil pitch. The mixer was set to a speed of 250-500 rpm and the temperature controller was set to a target temperature of 180° C. Once the temperature reached 180° C., 316.13 g of Dertoline P110 (DRT) was slowly added into the DP-1 with continuous mixing. After the P110 was incorporated into the blend, the mixing speed was increased to 2500-3000 rpm and 71.84 g of D-1184 (Kraton Polymer) was slowly added into the liquid. Afterwards, 14.39 g of G-1650 (Kraton Polymer) was slowly added to the mixture. High shear mixing was continued for 1 hour. The can was then removed from the high shear mixing set-up. The can was transferred to a heating mantle attached to a temperature controller and a low shear mixer set-up was put together above it. A paddle blade was immersed into the liquid and a thermocouple was inserted into the liquid. Mixing was maintained between 500-600 rpm and the temperature was kept at 180° C. for 3 hours, for a total of 4 hours of combined mixing at one or more mixing speeds chosen from 250-600 rpm, 2500-3000 rpm, or any combination thereof. The sample can was removed from the mixing and heating set-up and samples were prepared for testing.

Properties of Formulations 8 and 9 were tested and shown in Table 2A below. Table 2A also shows the corresponding properties of two comparative formulations—Comparative Formulation 4, which is an asphaltic adhesive commercially available from US Polyco™ as USP 3120; and Comparative Formulation 5, which is commercially available from Parker Hannifin as LORD HM 17-1.

TABLE 2A

| Formulation | Activation Temperature, (° F.) | Dahlquist Criterion Temperature, (° F.) | Peel Strength at 25° C. (MPa) |
|---|---|---|---|
| Comparative 4 | 63.5 | 68 | 7.3 |
| Comparative 5 | 14 | 32 | 1.4 |
| 8 | 45 | 50 | 9.9 |
| 9 | 45 | 63.5 | 7.9 |

Specifically, Table 2A, above, shows some data related to adhesive material performance, comparing the exemplary Formulations 8 and 9 with comparative Formulations 4 and 5.

Figure 2:
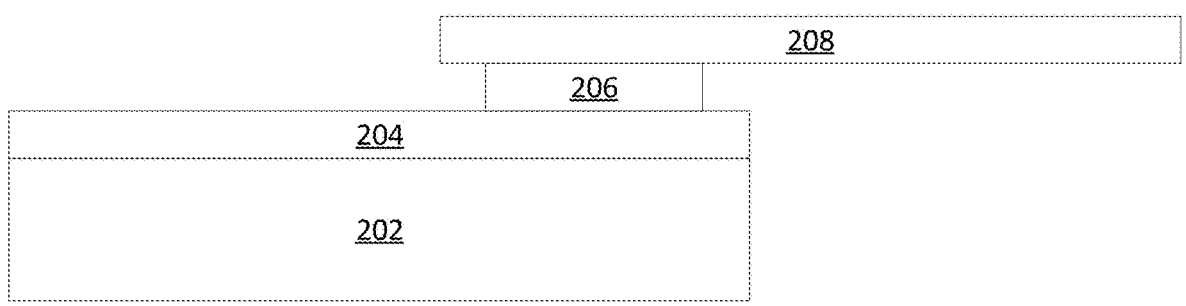
FIG. 2 depicts an exemplary system using an exemplary adhesive formulation according to some embodiments of the present disclosure.

Samples adhered using Formulation 8 and Comparative Formulations 6-8 were tested for shear strength and peel strength at 90°. The results are shown in Table 3. The adhesives were applied between an ethylene tetrafluoroethylene (ETFE) substrate and a thermoplastic polyolefin (TPO) substrate to form the samples. The ETFE substrate was adhered to a glass substrate to provide rigidity to the samples. The adhesives were applied in a region of approximately 1 square inch between the ETFE substrate and the TPO substrate. The shear strength test was performed using a test system commercially available from Instron®. The samples were preloaded at a rate of 20 mm/min until reaching 1 N of force, then tested at a rate of 50 mm/min until failure. The shear strength was tested at T0 at which the samples had not been artificially aged. The shear strength was also tested after 500 hours of aging at 135° C. After the 500 hours, the samples were returned to room temperature before testing the shear strength of the aged samples. The peel strength at 90° was obtained by lifting the TPO at 90° from the ETFE substrate. An example of the samples is shown in FIG. 2. As shown in a side view, a glass substrate 202 is fixed to an ETFE substrate 204. Adhesive 206 is applied between the ETFE substrate 204 and a TPO substrate 208.

TABLE 3

| | Shear Strength at T0 (N) | Shear Strength at T = 500 hours (N) | Peel Strength at 90° (N/cm) |
|---|---|---|---|
| Formulation 8 | 275 | 440 | 20 |
| Comparative Formulation 6 | 220 | 280 | 2 |
| Comparative Formulation 7 | 240 | 175 | 1 |
| Comparative Formulation 8 | 180 | 375 | 1 |

Comparative Formulations 6-8 each included greater than 90% asphalt. As such, each of the comparative formulations can be generally referred to as "asphalt-based adhesives." As shown in Table 3, samples utilizing Formulation 8 exhibited higher shear strengths (both before and after aging) and higher peel strengths at 90° than the samples using the Comparative Formulations 6-8.

All prior patents, publications, and test methods referenced herein are incorporated by reference in their entireties. Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A roofing system, comprising:
   a substrate; and
   an adhesive formulation,
     wherein the adhesive formulation is present on at least one surface of the substrate, and wherein the adhesive formulation comprises:
       10 wt % to 70 wt % of a filler, based on a total weight of the adhesive formulation,
       10 wt % to 70 wt % of at least one tackifier, based on the total weight of the adhesive formulation, wherein the at least one tackifier comprises a rosin ester;
       20 wt % to 70 wt % of at least one process oil, based on the total weight of the adhesive formulation;
       0.1 wt % to 50 wt % of at least one fire retardant, based on the total weight of the adhesive formulation; and
       0.5 wt % to 30 wt % of at least one polymer, based on the total weight of the adhesive formulation;
         wherein the at least one polymer comprises at least one of a styrene-butadiene-styrene (SBS) copolymer, a styrene-ethylene-butylene-styrene (SEBS) copolymer, ground tire rubber (GTR), or any combination thereof;
     wherein the adhesive formulation is free of asphalt or substantially free of asphalt.

2. The roofing system of claim 1, wherein the substrate is a plywood substrate, a glass substrate, a fiberglass substrate, a cellulosic substrate, a shingle, an underlayment, a roofing membrane, a roof deck, a photovoltaic (PV) panel, a modified bitumen (MODBIT) substrate, a rolled good, or any combination thereof.

3. The roofing system of claim 1, wherein the at least one process oil is chosen from at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), at least one tall oil, or any combination thereof.

4. The roofing system of claim 1, wherein the at least one polymer is present in an amount of 5 wt % to 15 wt %, based on the total weight of the adhesive formulation, wherein the at least one process oil is present in an amount of 40 wt. % to 50 wt. % based on the total weight of the adhesive formulation.

5. The roofing system of claim 1, wherein the adhesive formulation further comprises at least one second polymer chosen from: at least one polyolefin, oxidized polyethylene (OPE), polyethylene-polypropylene elastomer, isotactic polypropylene (IPP), atactic polypropylene (APP), or any combination thereof.

6. The roofing system of claim 5, wherein the at least one second polymer is present in an amount of 0.1 wt % to 20 wt %, based on the total weight of the adhesive formulation.

7. The roofing system of claim 1, wherein the filler is limestone powder, calcium carbonate, barium sulfate, calcium sulfate, talc, perlite, silica, fumed silica, precipitated silica, quartz, aluminum trihydrate, magnesium hydroxide, colemanite, titanium dioxide, fly ash, graphene nanoparticles, carbon black, recycled rubber tires, recycled shingles, recycled thermoplastic resins, basalt, roofing granules, clay, ammonium polyphosphate, graphite, or any combination thereof.

8. The roofing system of claim 1, wherein the filler is limestone powder.

9. The roofing system of claim 1, wherein the adhesive formulation further comprises at least one additive in an amount ranging from 0.00001% to 70% by weight of the adhesive formulation.

10. The roofing system of claim 9, wherein the at least one additive is at least one wax, at least one antioxidant, ethylene-bis-stearamide (EBS), or any combination thereof.

11. The roofing system of claim 1, wherein the at least one fire retardant is ammonium polyphosphate.

12. A method, comprising:
 combining a filler with at least one process oil, at least one tackifier, and at least one polymer, so as to form an adhesive formulation,
  wherein the adhesive formulation comprises:
   10 wt % to 70 wt % of the filler, based on a total weight of the adhesive formulation;
   10 wt % to 70 wt % of the at least one tackifier, based on the total weight of the adhesive formulation, wherein the at least one tackifier comprises a rosin ester;
   20 wt % to 70 wt % of the at least one process oil, based on the total weight of the adhesive formulation; and
   0.5 wt % to 30 wt % of the at least one polymer, based on the total weight of the adhesive formulation,
    wherein the at least one polymer comprises at least one of a styrene-butadiene-styrene (SBS) copolymer, a styrene-ethylene-butylene-styrene (SEBS) copolymer, ground tire rubber (GTR), or any combination thereof;
  wherein the adhesive formulation is free of asphalt or substantially free of asphalt.

13. The method of claim 12, wherein the at least one process oil is chosen from at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), at least one tall oil, or any combination thereof.

14. The method of claim 12, wherein the at least one polymer is present in an amount of 0.5 wt % to 30 wt %, based on the total weight of the adhesive formulation.

15. The method of claim 14, wherein the adhesive formulation further comprises at least one second polymer present in an amount of 0.1 wt % to 20 wt %, based on the total weight of the adhesive formulation, wherein the at least one second polymer is chosen from: at least one polyolefin, oxidized polyethylene (OPE), polyethylene-polypropylene elastomer, isotactic polypropylene (IPP), atactic polypropylene (APP), or any combination thereof.

16. The method of claim 12, further comprising 0.1 wt % to 50 wt % of at least one fire retardant, based on the total weight of the adhesive formulation.

17. A roofing system, comprising:
 a substrate; and
 an adhesive formulation,
  wherein the adhesive formulation is present on at least one surface of the substrate, and wherein the adhesive formulation comprises:
   10 wt % to 70 wt % of a filler, at least one tackifier, or any combination thereof, based on a total weight of the adhesive formulation;
   20 wt % to 70 wt % of at least one process oil, based on the total weight of the adhesive formulation;
   0.1 wt % to 50 wt % of at least one fire retardant, based on the total weight of the adhesive formulation; and
   0.5 wt % to 30 wt % of at least one polymer, based on the total weight of the adhesive formulation,
    wherein the at least one polymer comprises at least one of a styrene-butadiene-styrene (SBS) copolymer, a styrene-ethylene-butylene-styrene (SEBS) copolymer, ground tire rubber (GTR), or any combination thereof;
  wherein the adhesive formulation is free of asphalt or substantially free of asphalt.

18. The roofing system of claim 17, wherein the substrate is a plywood substrate, a glass substrate, a fiberglass substrate, a cellulosic substrate, a shingle, an underlayment, a roofing membrane, a roof deck, a photovoltaic (PV) panel, a modified bitumen (MODBIT) substrate, a rolled good, or any combination thereof.

19. The roofing system of claim 1, wherein the adhesive formulation further comprises at least one second polymer chosen from: at least one polyolefin, oxidized polyethylene (OPE), polyethylene-polypropylene elastomer, isotactic polypropylene (IPP), atactic polypropylene (APP), or any combination thereof.

20. The roofing system of claim 1, wherein the filler is limestone powder, calcium carbonate, barium sulfate, calcium sulfate, talc, perlite, silica, fumed silica, precipitated silica, quartz, aluminum trihydrate, magnesium hydroxide, colemanite, titanium dioxide, fly ash, graphene nanoparticles, carbon black, recycled rubber tires, recycled shingles, recycled thermoplastic resins, basalt, roofing granules, clay, ammonium polyphosphate, graphite, or any combination thereof.

* * * * *